US 9,206,986 B2

(12) United States Patent
Jeong et al.

(10) Patent No.: US 9,206,986 B2
(45) Date of Patent: Dec. 8, 2015

(54) BURNER

(71) Applicant: LG ELECTRONICS INC., Seoul (KR)

(72) Inventors: Yongki Jeong, Seoul (KR); Janghee Park, Seoul (KR); Jaebeom Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 233 days.

(21) Appl. No.: 13/961,191

(22) Filed: Aug. 7, 2013

(65) Prior Publication Data

US 2014/0041650 A1 Feb. 13, 2014

(30) Foreign Application Priority Data

Aug. 7, 2012 (KR) .................. 10-2012-0086113

(51) Int. Cl.
*F23D 14/04* (2006.01)
*F24C 3/08* (2006.01)

(52) U.S. Cl.
CPC . *F24C 3/085* (2013.01); *F24C 3/08* (2013.01); *Y02B 40/166* (2013.01)

(58) Field of Classification Search
CPC .............. F24C 3/085; F24C 3/00; F24C 3/08; F23D 14/06; F23D 14/62
USPC ............. 126/39 E, 39 R, 25 R; 431/284, 354
See application file for complete search history.

(56) References Cited

U.S. PATENT DOCUMENTS

| 5,842,849 A | 12/1998 | Huang .................. 431/284 |
| 2006/0121402 A1 | 6/2006 | Bettinzoli ............. 431/354 |
| 2007/0154858 A1* | 7/2007 | Cadima ................ 431/354 |
| 2007/0218414 A1* | 9/2007 | Harneit ................ 431/354 |
| 2010/0186730 A1* | 7/2010 | Cadeau et al. ......... 126/39 E |
| 2011/0120444 A1* | 5/2011 | Ryu et al. ............. 126/39 E |

FOREIGN PATENT DOCUMENTS

JP 2007-519885 7/2007

OTHER PUBLICATIONS

Korean Notice of Allowance issued in related Application No. 10-2012-0086113 dated Mar. 25, 2014.
Korean Office Action issued in Application No. 10-2012-0086113, dated Aug. 5, 2013.

* cited by examiner

*Primary Examiner* — Gregory Huson
*Assistant Examiner* — Nikhil Mashruwala
(74) *Attorney, Agent, or Firm* — Ked & Associates LLP

(57) ABSTRACT

A burner is provided. The burner may include a burner head having mixing pipes through which an air-gas mixture may flow, and a burner cap seated on the burner head and having an opening formed therein. The burner head may include a support wall along its periphery supporting the burner cap thereon and an inner wall formed within the periphery of the support wall, the inner wall having a plurality of flame holes. The center of the burner cap may be positioned within the opening.

17 Claims, 3 Drawing Sheets

BURNER

CROSS-REFERENCE TO RELATED APPLICATION(S)

This application claims priority under 35 U.S.C. §119 to Korean Application No. 10-2012-0086113 filed on Aug. 7, 2012, whose entire disclosure is hereby incorporated by reference.

BACKGROUND

1. Field

This relates to a burner.

2. Background

In general, burners may directly heat an object to be cooked or a container that contains an object to be cooked with flame generated by burning gas. Such burners may include a burner head, a burner cap covering the burner head, and an ejection device ejecting gas to the burner head.

BRIEF DESCRIPTION OF THE DRAWINGS

The embodiments will be described in detail with reference to the following drawings in which like reference numerals refer to like elements wherein.

DETAILED DESCRIPTION

Reference will now be made in detail to the embodiments of the present disclosure, examples of which are illustrated in the accompanying drawings.

In the following detailed description, reference is made to the accompanying drawings that form a part hereof, and in which is shown by way of illustration various exemplary embodiments. These embodiments are described in sufficient detail to enable those skilled in the art, and it is understood that other embodiments may be utilized and that logical structural, mechanical, electrical, and chemical changes may be made without departing from the spirit or scope as broadly described herein. To avoid detail not necessary to enable those skilled in the art, the description may omit certain information known to those skilled in the art. The following detailed description is, therefore, not to be taken in a limiting sense.

A burner for a cooktop may include a burner head and a burner cap that together define a gas chamber into which gas mixed with air, that is, a gas mixture, may be supplied, and flame holes through which the gas mixture may be ejected. Gas is ejected from a nozzle and supplied, as a gas mixture including gas mixed with air, into the gas chamber, and burned as it is discharged through the flame holes, thereby producing flame. However, since the flame is produced at the side of the burners, heat generated by the flame may flow along the side of a container positioned on the burner, and heat loss may occur. That is, as heat may flow along the side of the container instead of being concentrated on the bottom of the container, heat may be poorly concentrated on the container, and hating of contents of the container may take longer than necessary.

Figure 1:
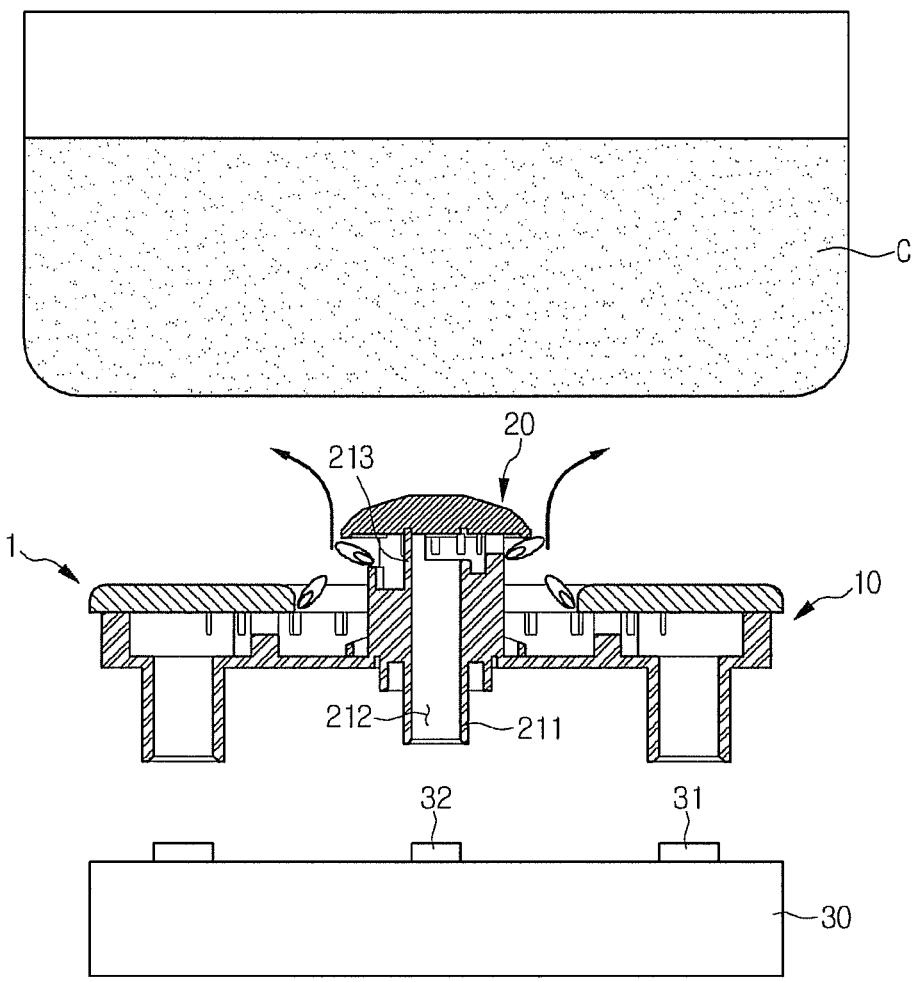
FIG. 1 is a cross-sectional view of a burner according to an embodiment as broadly described herein.
Figure 2:
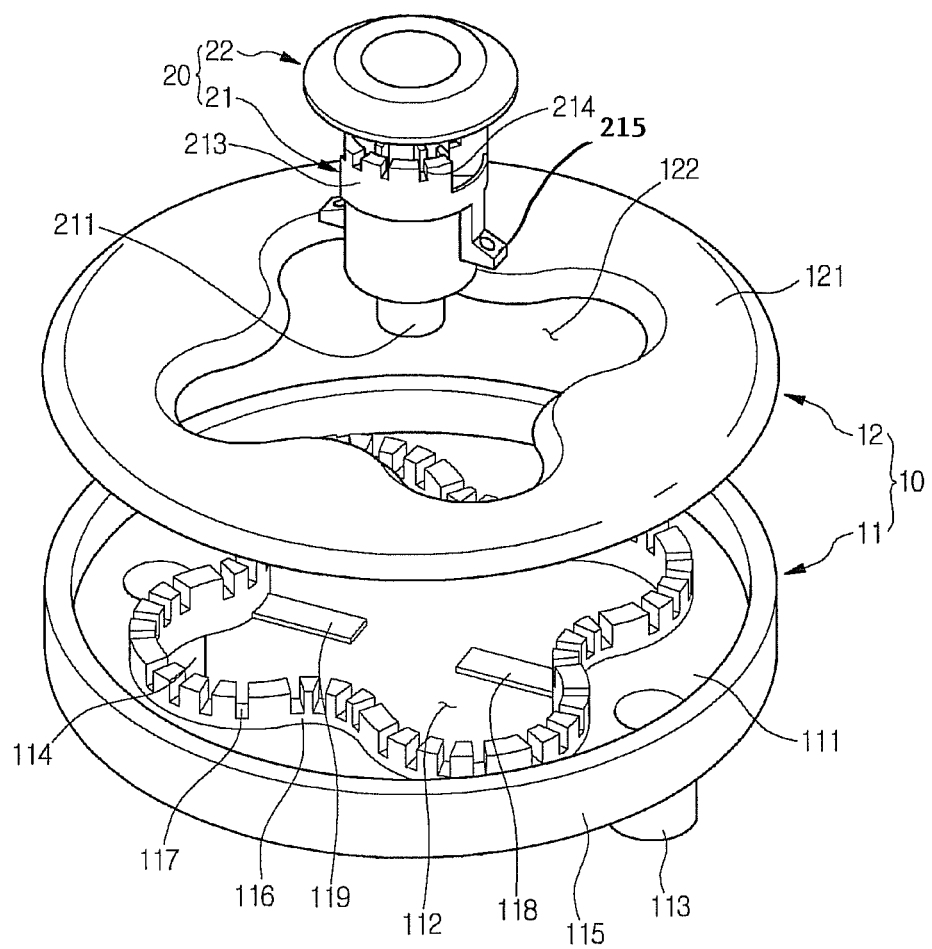
FIG. 2 is an exploded perspective view of the burner shown in FIG. 1.
Figure 3:
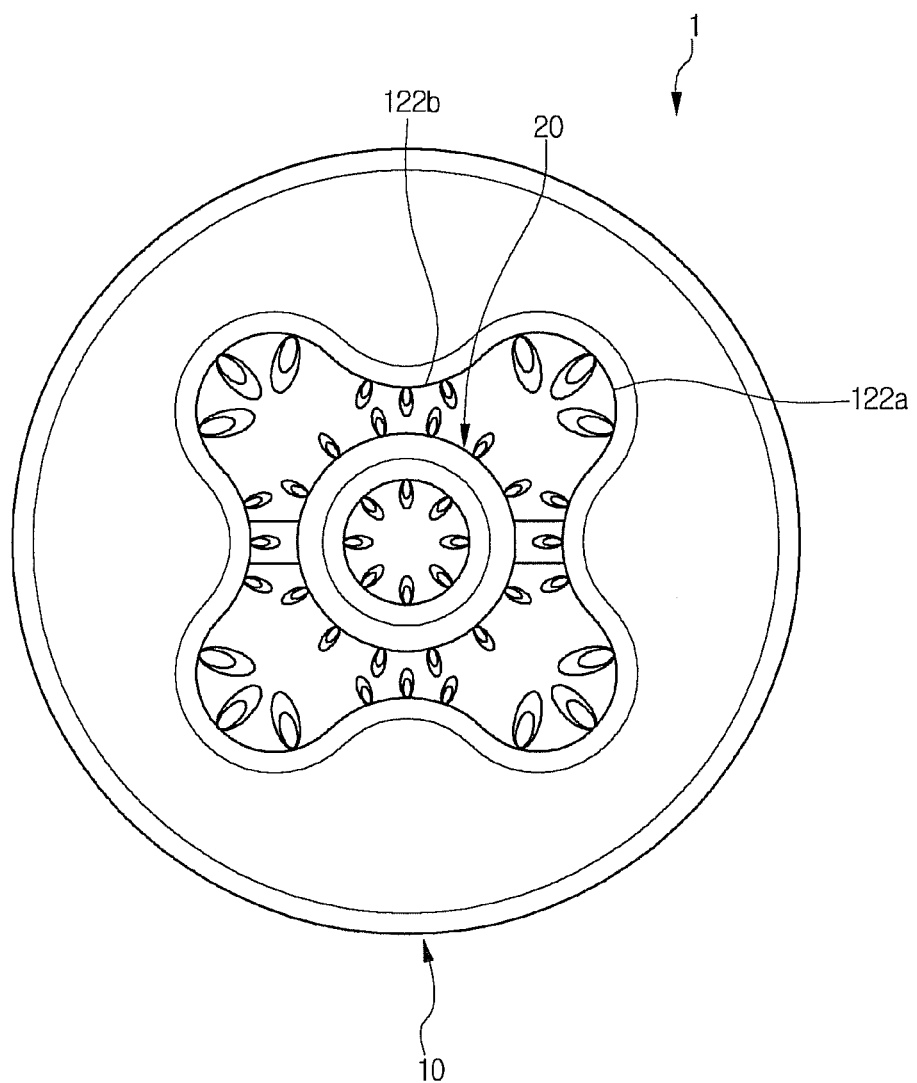
FIG. 3 is a plan view of the burner shown in FIG. 1.

Referring to FIGS. 1 to 3, a burner 1 according to an exemplary embodiment as broadly described herein may include a first burner 10, a second burner 20 seated on the first burner 10, and an ejection device 30 supplying gas to the first burner 10 and the second burner 20.

The first burner 10 may include a first burner head 11 and a first burner cap 12 covering the first burner head 11. The first burner head 11 may include a burner base 111 with a first opening 112. The burner base 111 has one or more first mixing pipes 113 and 114 through which a gas mixture of gas and air flows. Although FIG. 2 exemplifies that the burner base 111 has two first mixing pipes 113 and 114, it should be noted that the number of the mixing pipes is not limited in the embodiment.

A support wall 115 supporting the first burner cap 12 may be formed on the edge of the burner base 111. The support wall 115 may extend upward from the edge of the burner base 111. The support wall 115 may be continuously formed along the edge of the burner base 111. That is, the support wall 115 may form a closed loop.

An inner wall 116 having a plurality of first holes 117 may be formed inside the support wall 115. That is, the inner wall 116 may be spaced apart from the support wall 115, a distance from the inner wall 116 to the center of the burner base 111 being less than a distance from the support wall 115 to the center of the burner base 111. The inner wall 116 may extend upward from the portion of the burner base 111 where the first opening 112 is formed. The first burner cap 12 may be seated on the inner wall 116 or the support wall 115. The inner wall 116 may have a shape corresponding to the first opening 112.

The first mixing pipes 113 and 114 may be disposed in an area between the support wall 115 and the inner wall 116 on the burner base 111. Accordingly, a gas mixture flowing through the first mixing pipes 113 and 114 may be supplied into the flow space formed between the support wall 115 and the inner wall 116. Since the inner wall 116 is within the periphery of the space defined by the support wall 115, close to the first opening 112, the gas mixture supplied into the flow space flows to the center portion of the first burner head 11. When the first burner head 11 is seen from above, the support wall 115 may have a substantially circular shape and the inner wall 116 may have a non-circular shape.

One or more supports 118 and 119 supporting the second burner 20 may be formed inside the first opening 112 of the burner base 111. Although FIG. 2 shows two supports 118 and 119 are formed on the burner base 111, the number of supports is not limited in the embodiment.

The first burner cap 12 may include a cap body 121 and a second opening 122 having a shape corresponding to the first opening 112 of the first burner head 111. A size of the second opening 122 may be the same as or smaller than that of the first opening 112. Further, the second opening 122 may be smaller in area than the area defined by the inner wall 116. The center of the first burner cap 12 may pass through the first opening 112 and the second opening 122. That is, the second opening 122 may be formed at the center portion of the cap body 121.

The second opening 122 may be positioned between the edge and the center of the cap body 121. In detail, the wall defining the second opening 122 may have at least one first portion 122a and at least one second portion 122b. The distance between the second portion 122b and the center of the second opening 122 (or the first burner cap) is less than the distance between the first portion 122a and the second opening 122 (or the first burner cap). In the embodiment, a plurality of first portions 122a and a plurality of second portions 122b may be alternately arranged.

Since a shape of the inner wall 116 corresponds to the second opening 122, the inner wall 116 may also have a first portion and a second portion that are the same in shape as the first portion and the second portion of the second opening 122. Accordingly, the distance between the second portion of the inner wall 116 and the first opening 112 is smaller than the distance between the first portion and the first opening 112.

The second burner 20 may include a second burner head 21 and a second burner cap 22 covering the second burner head 21. The second burner head 21 may include a second mixing pipe 211 forming a channel 212 for a gas mixture, a support wall 213 supporting the second burner cap 22 and having a plurality of second flame holes 214, and one or more fastening portions 215 coupled to the supports 118 and 119 of the first burner head 11. The second burner 20 may be seated onto the supports 118 and 119 through the second opening 122 and extend through the first opening 112. When the second burner 20 is combined with the first burner 10, the second flame holes 214 are positioned higher than the first flame holes 117.

The ejection device 30 may eject gas to the first burner 10 and the second burner 20 from under the first burner 10 and the second burner 20. The ejection device 30 may include one or more nozzles 31 ejecting gas to the first burner and a second nozzle 32 ejecting gas to the second burner 20. The first nozzles 31 are aligned with the first mixing pipes 113 and 114, at a predetermined distance from the first mixing pipes 113 and 114. The second nozzle 32 is aligned with the second mixing pipe 211, at a predetermined distance from the second mixing pipe 211.

In certain embodiments, the ejection device 30 may eject gas only to the first burner 10, or only to the second burner 20, or to both the first burner 10 and the second burner 20.

Operation of the burner 1, and ejecting gas to the first burner 10 and the second burner 20 will now described.

When a user operates an operating device of an assembly to which the burner is operably coupled, a valve opens and gas is supplied to the ejection device 30. Then, gas is ejected at a relatively high speed to the mixing pipes 113, 114, and 211 from the nozzles 31 and 32 of the ejection device 30. Since the nozzles 31 and 32 and the mixing pipes 113, 114, and 211 are spaced apart from each other, air around the mixing pipes 113, 114, and 211 is sucked into the mixing pipes 113, 114, and 211 along with the gas that is ejected from the nozzles 31 and 32 to the mixing pipes 113, 114, and 211, and the gas and the air are mixed in the mixing pipes 113, 114, and 211.

First, as for the flow of the air-gas mixture in the first burner 10, the gas mixture in the first mixing pipes 113 and 114 is supplied into the flow space between the support wall 115 and the inner wall 116. The gas mixture in the flow space is discharged to the center portion of the first burner head 11 through the first flame holes 117 and ignited by an igniter operated by the operation device. Therefore, the gas mixture is burned and a container C positioned on the burner 1 is heated by flame, such that is the contents of the container C are heated/cooked.

Next, as for the flow of the air-gas mixture in the second burner 20, the gas mixture in the second mixing pipe 211 is discharged outside the second burner 20 through the second flame holes 214 of the support wall 213. The gas mixture discharged outside the second burner 20 is ignited by the flame corresponding to the second portion 122b of the first burner 12, in the first burner head 11. That is, as shown in FIG. 3, since the second portion 122b is closer to the second burner 20 than the first portion 122 of the burner cap 12 and the inner wall 116 has the shape corresponding to the second opening 122 of the first cap 12, the flame 116 around the inner wall 116 may spread to the second burner 20.

On the other hand, referring to FIGS. 1 to 3, as for the position of the flame produced in the burner of the embodiment, since, for the first burner 10, the support wall 115 is outside the inner wall 116, flame is produced inside the first burner 10, and not outside the first burner 10, that is, around the second opening 122, and passes through the second opening 122. Therefore, substantially all of the heat of the flame produced in the first burner 10 transfers to the bottom of the container C, such that the heat is concentrated on the container C and unnecessary loss of heat may be prevented.

Although the flame of the second burner 20 is produced outside the second burner 20, the second burner 20 is at the center portion of the first burner 10. Thus, the heat generated by the flame of the second burner 20 may also be concentrated on the bottom of the container C.

Although it was described above that the flame of the second burner 20 is produced outside the second burner 20, when an opening is formed at the center of the second burner cap 22, the flame may be produced toward the center of the opening of the burner cap 22.

Further, although the burner described above includes a first burner and a second burner, the burner may include only the first burner.

Embodiments provide a burner.

In one embodiment, a burner as broadly described herein may include a burner head having mixing pipes through which a gas mixture flow; and a burner cap seated on the burner head and having an opening spaced from an edge of the burner cap to a center portion thereof, wherein the burner head includes a support wall supporting the burner cap and an inner wall having a plurality of flame holes spaced inside from the support wall, and a center of the burner cap passes through the opening.

In another embodiment, a burner as embodied and broadly described herein may include a first burner including a first burner head and a first burner cap covering the first burner head and having an opening at the center potion; and a second burner including a second burner head seated on the first burner head through the opening of the first burner cap and a second burner cap covering the second burner head, wherein flame generated in the first burner passes through the opening.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A burner, comprising:
a burner head having mixing pipes through which a gas mixture flows;
a burner cap seated on the burner head and having an opening formed at a central portion thereof; and
an auxiliary burner head seated on the burner head through the opening of the burner cap, and an auxiliary burner cap seated on the auxiliary burner head, wherein the burner head includes a support wall that extends along a peripheral portion thereof and supports the burner cap thereon, and an inner wall formed inside of a periphery of the support wall, the inner wall having a plurality of flame holes formed therein, and wherein a flame pattern generated by the burner head and burner cap, and the auxiliary burner head and auxiliary burner cap includes:
a first set of flames directed inward through the plurality of flame holes formed in the inner wall of the burner head toward a center thereof;
a second set of flames directed outward from the auxiliary burner head through a plurality of auxiliary flame holes formed in the auxiliary burner head; and
a third set of flames directed inward from the auxiliary burner head toward a center thereof.

2. The burner of claim 1, wherein the mixing pipes are disposed at positions corresponding to a space between the support wall and the inner wall.

3. The burner of claim 1, wherein the opening in the burner cap is non-circular and a shape of the inner wall corresponds to the shape of the opening.

4. The burner of claim 1, wherein a wall defining the opening in the burner head has a plurality of first portions and a plurality of second portions, wherein the plurality of first portions and the plurality of second portions are alternately arranged, and wherein a distance between each second portion and the center of the burner cap is less than a distance between each first portion and the center of the burner cap.

5. The burner of claim 1, wherein an area defined within the opening in the burner cap is smaller than an area defined within a periphery of the inner all of the burner head.

6. The burner of claim 1, wherein flame generated in the burner head passes through the opening of the burner cap.

7. The burner of claim 1, wherein the plurality of auxiliary flame holes is formed in an outer wall of the auxiliary burner head on which the auxiliary burner cap is seated, and wherein the burner further includes an auxiliary mixing pipe that extends through the auxiliary burner head through which the gas mixture flows.

8. A burner, comprising:
a first burner including a first burner head and a first burner cap that covers the first burner head, the first burner cap having an opening at a center portion thereof; and
a second burner including a second burner head seated on the first burner bead and extending through the opening of the first burner cap, and a second burner cap that covers the second burner head, wherein flame generated in the first burner passes through the opening in the first burner cap, and wherein a flame pattern generated by the first burner head and first burner cap, and the second burner head and second burner cap includes:
a first of flames directed inward through a plurality of first flame holes formed in the first burner head toward a center thereof;
a second set of flames directed outward from the second burner head through a plurality of second flame holes formed in the second burner head; and
a third set of flames directed inward from the second burner head toward a center thereof.

9. The burner of claim 8, wherein the first burner head comprises a support wall that supports the first burner cap, and an inner wall positioned inside of and spaced apart from the support wall, the inner wall having the plurality of first flame holes formed therein.

10. The burner of claim 9, wherein the first burner cap is seated on the support wall or the inner wall.

11. The burner of claim 9, wherein the inner wall comprises a plurality of first portions and a plurality of second portions, the plurality of first portions and the plurality of second portions being alternately arranged, and wherein a distance between each first portion and a center of the first burner head is less than a distance between each second portion and the center of the first burner head.

12. The burner of claim 11, wherein the plurality of first portions and the plurality of second portions are alternately arranged, end to end, so as to form a closed loop.

13. The burner of claim 12, wherein the support wall extends along a periphery of the first burner head and surrounds the inner wall.

14. The burner of claim 9, wherein the first burner head comprises an opening having the same shape corresponding to the opening of the first burner cap.

15. The burner of claim 14, wherein the first burner head comprises one or more supports that support the second burner head, wherein the one or more supports are disposed along a periphery of the opening of the first burner head.

16. The burner of claim 15, wherein the plurality of second flame holes is positioned higher than the plurality of first flame holes when the second burner head is seated on the one or more supports provided on the first burner head.

17. The burner of claim 14, wherein the second burner head includes a mixing pipe through which a gas mixture is introduced, wherein the mixing pipe passes through the opening of the first burner.

* * * * *